United States Patent
Mei et al.

(10) Patent No.: US 8,989,442 B2
(45) Date of Patent: Mar. 24, 2015

(54) ROBUST FEATURE FUSION FOR MULTI-VIEW OBJECT TRACKING

(71) Applicant: Toyota Motor Engineering & Manufacturing North America, Inc., Erlanger, KY (US)

(72) Inventors: Xue Mei, Ann Arbor, MI (US); Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 114 days.

(21) Appl. No.: 13/861,632

(22) Filed: Apr. 12, 2013

(65) Prior Publication Data

US 2014/0307917 A1 Oct. 16, 2014

(51) Int. Cl.
*G06K 9/00* (2006.01)

(52) U.S. Cl.
CPC .................................. *G06K 9/00624* (2013.01)
USPC ............................................................ 382/103

(58) Field of Classification Search
CPC ................................................... G06K 9/00624
USPC ............................................................ 382/103
See application file for complete search history.

(56) References Cited

U.S. PATENT DOCUMENTS

| | | | |
|---|---|---|---|
| 8,055,095 B2* | 11/2011 | Palotai et al. | 382/276 |
| 8,295,548 B2 | 10/2012 | Banerjee et al. | |
| 2002/0044691 A1* | 4/2002 | Matsugu | 382/218 |
| 2003/0014379 A1* | 1/2003 | Saias et al. | 706/45 |
| 2009/0278937 A1* | 11/2009 | Botchen et al. | 348/169 |
| 2010/0176952 A1* | 7/2010 | Bajcsy et al. | 340/573.1 |
| 2011/0050940 A1 | 3/2011 | Lanz et al. | |
| 2013/0245429 A1* | 9/2013 | Zhang et al. | 600/424 |

OTHER PUBLICATIONS

X. Mei and H. Ling. "Robust Visual Tracking and Vehicle Classification via Sparse Representation", IEEE Trans. Pattern Anal. Mach. Intell. 33(11): pp. 2259-2272, 2011.

T. Zhang, B. Ghanem, S. Liu, and N. Ahuja. "Robust Visual Tracking via Multi-Task Sparse Learning", Proc. IEEE Conf. on Computer Vision and Pattern Recognition, pp. 2042-2049, 2012.

P. Gong, J. Ye and C. Zhang. "Robust multi-task feature learning", ACM SIGKDD Int. Conf. on Knowledge Discovery and Data Mining, pp. 895-903, 2012.

* cited by examiner

*Primary Examiner* — Tom Y Lu
(74) *Attorney, Agent, or Firm* — Gifford, Krass, Sprinkle, Anderson & Citkowski, P.C.

(57) ABSTRACT

Multi-Task Multi-View Tracking (MTMVT) is used to visually identify and track an object. The MTMVT employs visual cues such as color, edge, and texture as complementary features to intensity in the target appearance representation, and combines a multi-view representation with a robust multi-task learning to solve feature fusion tracking problems. To reduce computational demands, feature matrices are sparsely represented in a single matrix and then decomposed into a pair of matrices to improve robustness to outliers. Views and particles are further combined based on interdependency and commonality single computational task. Probabilities are computed for each particle across all features and the particle with the greatest probability is selected as the target tracking result.

12 Claims, 9 Drawing Sheets

ROBUST FEATURE FUSION FOR MULTI-VIEW OBJECT TRACKING

FIELD OF THE INVENTION

The present invention relates generally to a system for tracking an object using a sensor network. Specifically, tracking an object with robust multi-task multi-view joint sparse representation and dynamic view weighting.

BACKGROUND OF THE INVENTION

Object tracking systems are often used in automotive and industrial settings to identify and follow objects of interest. These systems generally use sensors such as laser rangefinders, radars, or camera systems to identify and track objects. While basic tracking systems can be effective in controlled environments, they are often ineffective in real-world situations such as driving an automobile down a city street where complex and sophisticated object tracking is required.

Visual video tracking allows objects to be tracked using a wide range of modalities including color, shape, or brightness. However, video tracking can be a time-consuming process due to the amount of data that is contained in video. Furthermore, object recognition techniques necessary for tracking are complex and require significant computer processing. To counteract these issues, many video tracking systems only track a single modality such as color while other tracking systems use databases of stored objects. While these systems can accurately track objects under certain conditions, there exists a need for a computationally efficient video tracking system that does not track based on a single modality or rely on a database of stored objects to track a target object.

Modern video tracking systems also make use of algorithms to analyze sequential video frames and track the movement of targets between the frames. Different algorithms have unique strengths and weaknesses, and the choice of algorithm is largely based upon the intended use of the tracking system. Common tracking algorithms are either geared towards target representation and localization or filtering and data association.

Techniques utilizing target representation and localization are generally bottom-up processes with generally low computational complexity. However, these algorithms are primarily used when the camera is static or the tracking is relatively simple. Filtering and data association algorithms are generally top-down processes that incorporate additional factors into the object tracking algorithm. These algorithms are generally more computationally complex and can factor in information about background characteristics, object dynamics, and other features. These methods also are able to handle complex object interaction such as tracking moving objects behind obstructions. The video tracker may also be mounted on a moving foundation while tracking another moving object. However, these filtering and data association methods are extremely complex and require significant computational power.

It would therefore be beneficial for an object tracking system to combine observations from multiple views including various types of visual features to accurately track an object in a wide variety of situations. It would also be beneficial to reduce the number of individual tasks normally associated with complex visual tracking methods and jointly consider the underlying relationships between tasks across different views and different particles to tackle the problem in a unified robust multi-task formulation.

SUMMARY OF THE INVENTION

Sparse representation has recently been introduced for tracking objects by Mei and Ling in "Robust Visual Tracking and Vehicle Classification via Sparse Representation." In the Mei reference, a tracking candidate is sparsely represented as a linear combination of target templates and trivial templates. In particle filter based tracking methods, particles are randomly sampled around the current state of the target according to a zero-mean Gaussian distribution. Each particle shares a great deal of dependencies with other particles. Multi-task learning aims to improve the performance of multiple related tasks by exploiting the intrinsic relationships among them. In "Robust Visual Tracking via Multi-Task Sparse Learning" by Zhang et al., learning the representation of each particle is viewed as an individual task and joint sparsity learning for all particles are employed. However, the Zhang reference assumes that all tasks share a common set of features, which is too restrictive and will not hold up in visual tracking applications, since outlier tasks often exist. For example, few distant particles are sampled far away from a main cluster of particles. These distant particles have little overlap with the cluster and will be considered outliers. In addition, both the Mei and Zhang references only use intensity features to model the appearance change of the target. The intensity appearance model with $l_1$ minimization is very robust to partial occlusion, noise, and other tracking challenges. However, it is very sensitive to shape deformation of targets such as non-rigid objects.

To overcome the above problems, the present tracker employs other visual cues such as color, edge, and texture as complementary features to intensity in the target appearance representation, and combines a multi-view representation with a robust multi-task learning to solve visual tracking problems. Within the tracker, the sparse representation for each view is learned as a linear combination of atoms from an adaptive feature dictionary, i.e. each view owns a sparse representation instead of sharing an identical one, which enables the tracker to capture the different statistics carried by different views. To exploit the interdependencies shared between different views and particles, the $l_{1,2}$-norm group-sparsity regularization is imposed on the representation matrix to learn the multi-view sparse representation jointly in a multi-task manner. To handle the outlier particles from particle sampling, the sparse representation is decomposed into two collaborative parts, thereby learning representative coefficients and detecting the outlier tasks simultaneously.

In particular, the overall contribution of the tracker of the present invention is six-fold. First, the tracker utilizes multiple types of features in sparse representation based framework for tracking. Compared to previous trackers based on similar framework found in the Mei and Zhang references, the tracker not only is able to take advantage of the robustness to the occlusion from sparse representation, but also introduces complementary multiple view representation for robust appearance modeling. Second, the tracker treats every view in each particle as an individual task and jointly considers the underlying relationships shared among different views and different particles in a multi-task learning framework. Third, to capture the outlier tasks that frequently emerge in a particle sampling process, the tracker employs the robust multi-task scheme by decomposing the coefficient matrix into two collaborative components. Fourth, dynamic view weighting helps select the most representative views for the minimum error reconstruction by employing the entropy of each view's probability. The most discriminative views are given higher weight in the object appearance representation. Therefore, the tracker is robust to the confusions caused by some views by selecting discriminative views to model the appearance variations of the object against the background. Fifth, the Multi-Task Tracker and L1 tracker are special cases of the Multi-Task Multi-View Tracking (MTMVT) formulation of the present invention. Sixth, outlier rejection is used to identify outlier tasks and improve resampling efficiency by setting posterior probabilities of outliers to zero, thereby removing the outliers from the resampling process.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PREFERRED EMBODIMENTS

Sparse representation based L1 trackers of the Mei reference perform tracking by finding a sparse representation in the template subspace. The representation is then used with the particle filter framework for visual tracking. However, the intensity only based appearance representation is prone to fail for difficult scenarios such as tracking a non-rigid object such as, for example, people whose silhouette can change due to their walking, seating, etc. Employing multiple types of features has proven beneficial for tracking because the ensemble of the multiple views provides a comprehensive representation of the target appearance undergoing various changes such as illumination, deformation, etc. However, combining multiple views by simply concatenating features into a high-dimensional feature vector has proven inappropriate since different features have different statistic properties. The present tracker employs other visual cues such as color, edge, and texture as complementary features to intensity in the target appearance representation, and combines a multi-view representation with a robust multi-task learning to solve visual tracking problems. The MTMVT will first be generally described with reference to an exemplary embodiment followed by a thorough discussion of the MTMVT algorithms.

Figure 1A:
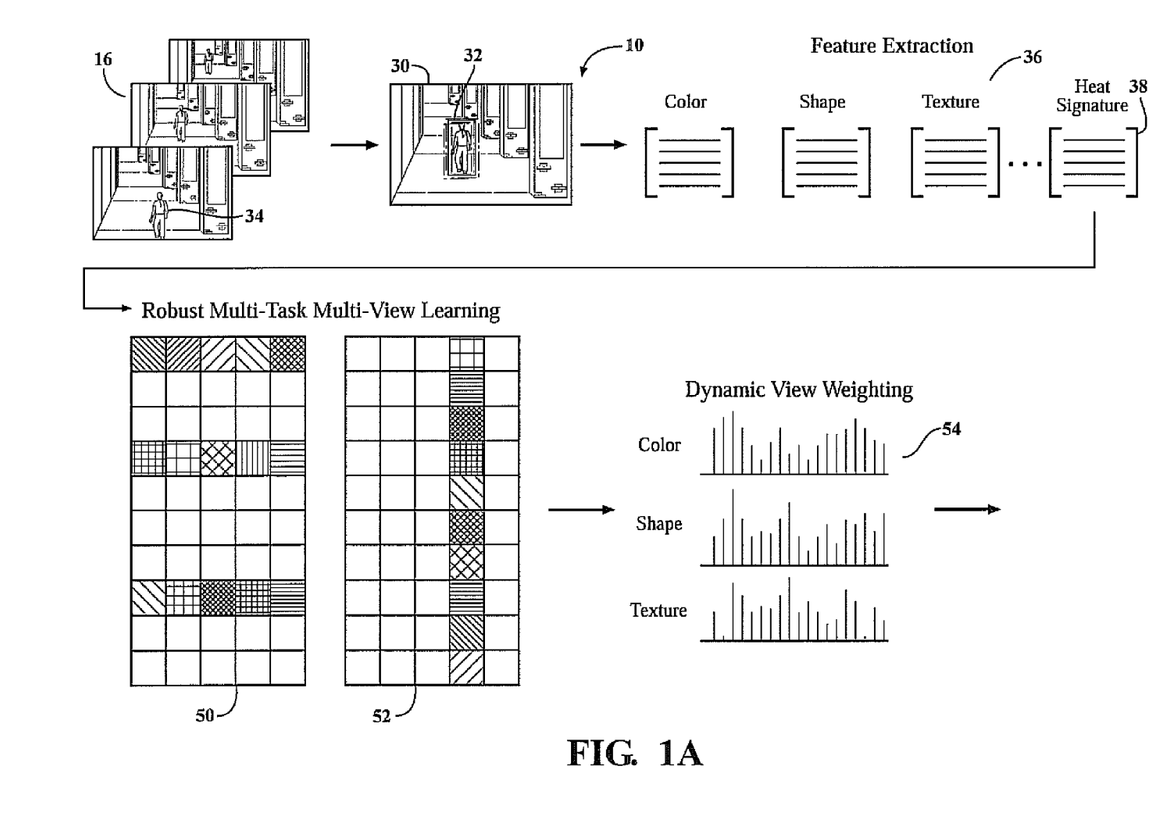
FIG. 1A is the first part of an illustrative example of the steps of the MTMVT.
Figure 1B:
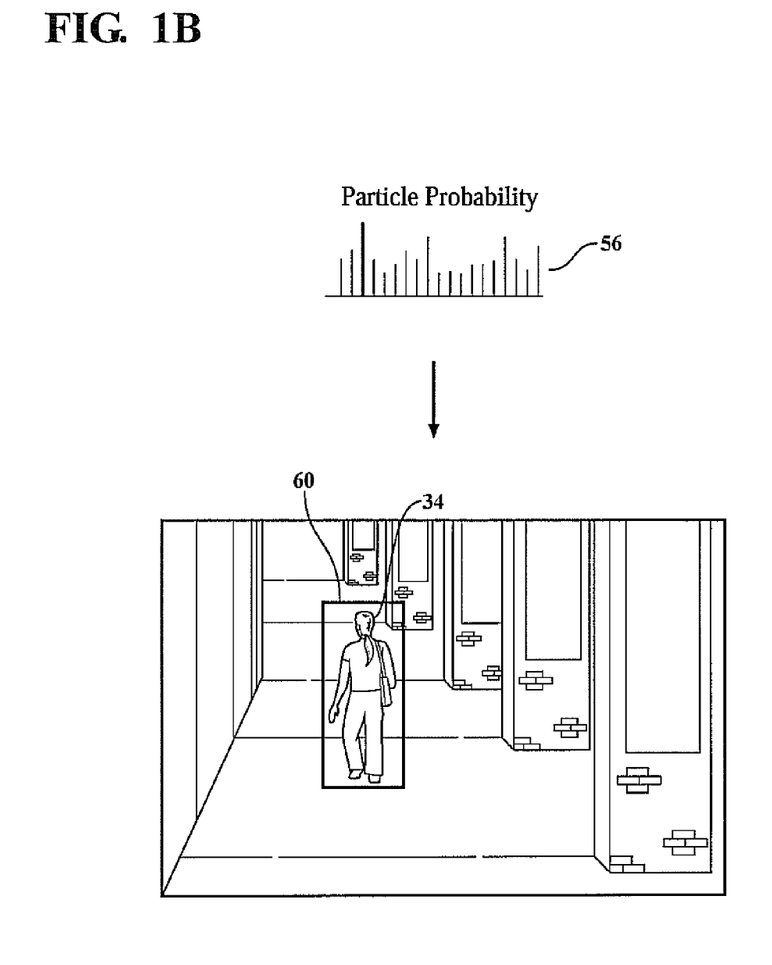
FIG. 1B is a continuation of the illustrative example from FIG. 1A.

First, in reference to FIG. 1, the MTMVT 10 of the present invention tracks an object 34 using a computer processing unit (CPU) 12, a memory unit 14, and data frames 16 obtained from a sensor network 26. The sensor network 26 captures a plurality of data frames 16 which are stored sequentially in the memory unit 14. A digital video camera 18 was used in the sensor network 26, however, the MTMVT 10 is not limited to using a digital video camera 18 and additional sensors including radar 20, lidar 22, or infrared 24 may be used. The CPU 12 processes the data frames 16 and implements the MTMVT 10 algorithms to track the object 34 throughout the data frames 16.

Using a starting reference frame 30, the MTMVT 10 obtains a plurality of particles 32 proximate to the location of the object 34 in the reference frame 30. A set of multiple features 36 are extracted from each of the particles 32 and organized into feature matrices 38. The feature matrices 38 are combined and then sparsely represented in a representation matrix 40 using a multi-task formulation. The representation matrix 40 is then decomposed into a pair of collaborative weight matrices 50, 52 and the reconstruction error is minimized using penalty terms. The probabilities for each feature 54 are then combined into a particle probability 56. The tracking target result 60 is then computed by selecting the particle 32 with the highest probability 56.

Figure 2:
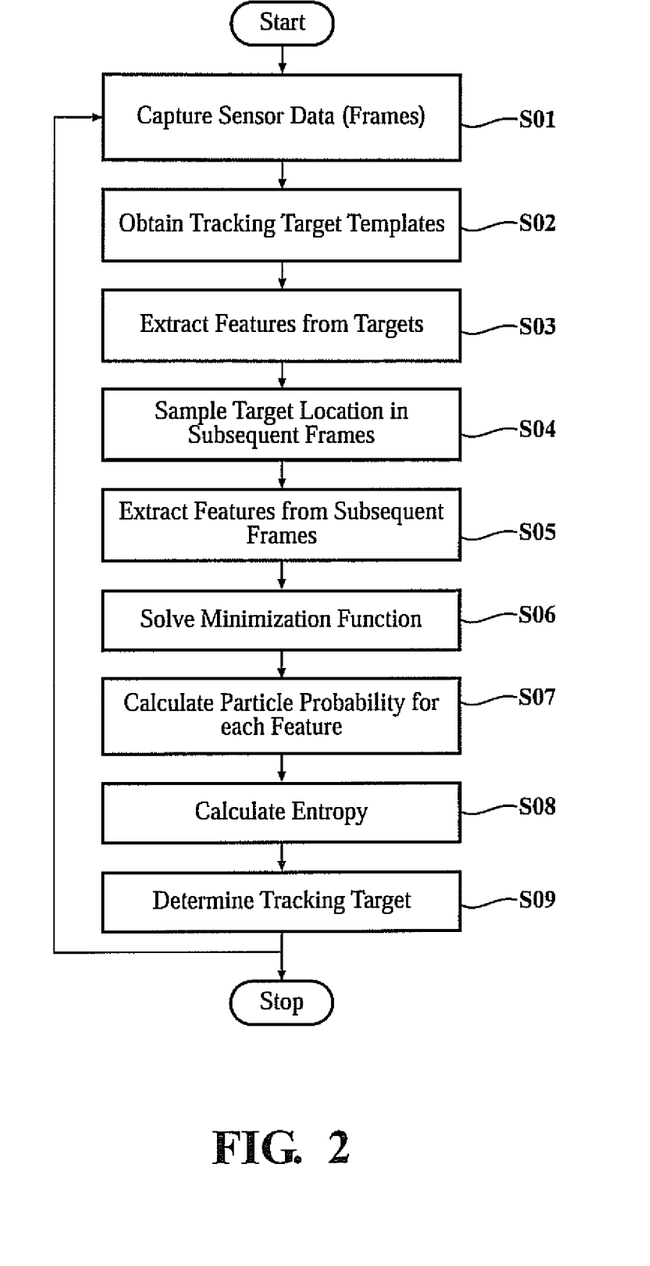
FIG. 2 is a flow chart illustrating the steps of the MTMVT.

An overview of the MTMVT 10 method is generally shown in FIGS. 1-2. In step S01 of the MTMVT 10 method, the sensor network 26 captures the data frames 16 containing the object 34 to be tracked. In the exemplary embodiment, a digital video camera 18 is used to capture the frames 16. The frames 16 are then stored sequentially in the memory unit 14 to be processed by the CPU 12. The CPU 12 then selects a reference frame 30 and identifies the object 34 within the reference frame 30. In step S02 the MTMVT 10 obtains a plurality of tracking target templates or particles 32 from the reference frame 30. The particles 32 are located in an area of the reference frame 30 proximate to the location of the object 34. A plurality of rectangular particles 32 are shown encompassing various amounts of the object 34 in the reference frame 30, although the number and location of the particles 32 is only demonstrative. The particles 32 are shown in greater detail in FIG. 3. Specifically, the reference frame 30 has a plurality of particles 32 surrounding the object 34 to be tracked.

Figure 3:
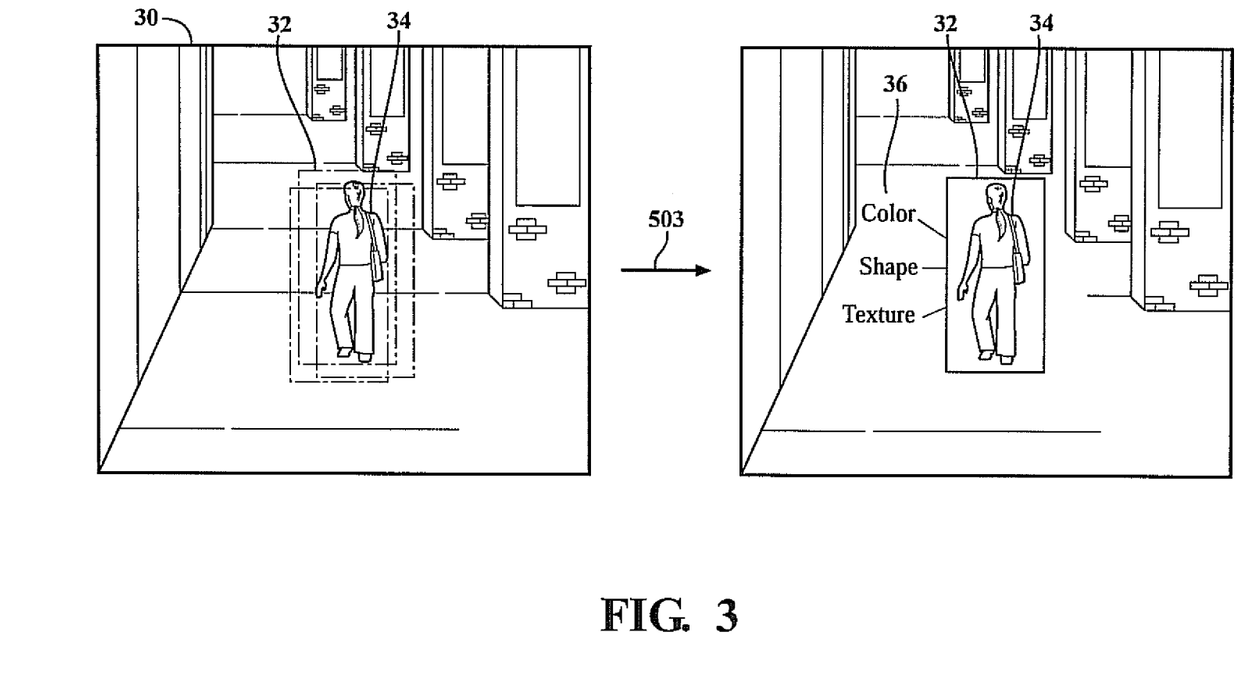
FIG. 3 depicts extracting features from a particle.

In step S03 the CPU 12 extracts a set of features 36 from the particles 32 gathered from the reference frame 30. These features 36 can include particle color, shape, texture, or other features such as heat signature depending on the sensors in the senor network 26. The transition from step S02 to step S03 is shown in FIG. 3, where the CPU 12 extracts a demonstrative set of features 36 from a particle. The features 36 for each particle 32 are indexed in a plurality of feature matrices 38 and stored in the memory unit 14. The process then proceeds to step S04 and S05 where additional particles 32 are sampled from data frames 16 subsequent to the reference frame 30 and then the same set of features 36 are extracted from these new particles 32. The set of features 36 corresponding to the particles 32 sampled from subsequent frames are again indexed in the feature matrices 38 and stored in the memory unit 14.

Once the set of feature matrices 38 are populated with particle data, the MTMVT 10 sparsely represents the set of features 36 into a representation matrix 40 using a multi-task formulation. Other tracking methods treat each particle 32 or each feature/view 36 as a single task, which increases the computational demands of the tracker. However, the MTMVT 10 uses a multi-task formulation to combine each particle 32 and feature 36 into a single task. This improves the computational efficiency of the tracker 10 and will be explained in greater detail below.

Following the sparse representation of the particles 32, in step S06 the representation matrix 40 is decomposed into a pair of collaborative weight matrices 50, 52. The collaborative weight matrices 50, 52 are then minimized to identify and remove outliers 62. By decomposing the representation matrix 40 and minimizing the resulting collaborative weight matrices 50, 52, the MTMVT's 10 robustness to outliers 62 is improved. This in turn leads to a more accurate reconstruction and reduced error in the MTMVT 10.

Having minimized the collaborative weight matrices 50, 52, the MTMVT 10 calculates the feature probabilities 54 in step S07. As shown in FIG. 1(A), the dynamic view weighting of each particle 32 encompasses a feature probability 54 previously extracted in step S03. By separating the feature probabilities 54 by feature 36, the MTMVT 10 can evaluate the effectiveness of each feature 36 and appropriately weight the result. The individual feature probabilities 54 are then combined to form the particle probability 56. The entropy of the normalized particle probability 56 is calculated in step S08 and applied to the particle probability 56.

Once the MTMVT 10 has the particle probability 56 for all the particles 32, the tracking target result 60 is identified as the particle 32 with the maximum particle probability 56. As shown in FIG. 1(B), the tracking target result 60 is the particle 32 selected to represent the object 34. Of all the particles 32 identified in step S02, the tracking target result 60 has the highest particle probability 56 of representing the object 34. After the tracking target result 60 has been identified in step S09, the MTMVT 10 returns back to step S01 and continues tracking objects.

Figure 4:
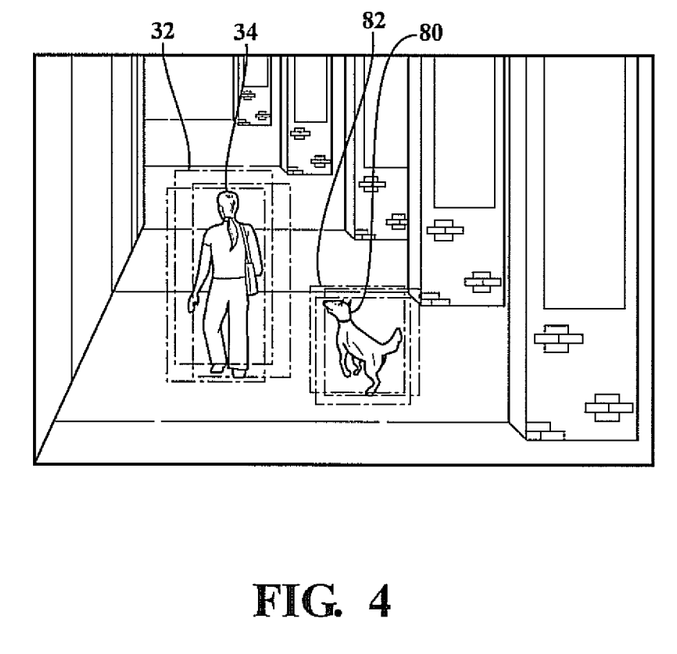
FIG. 4 depicts a frame having multiple tracked objects.
Figure 5:
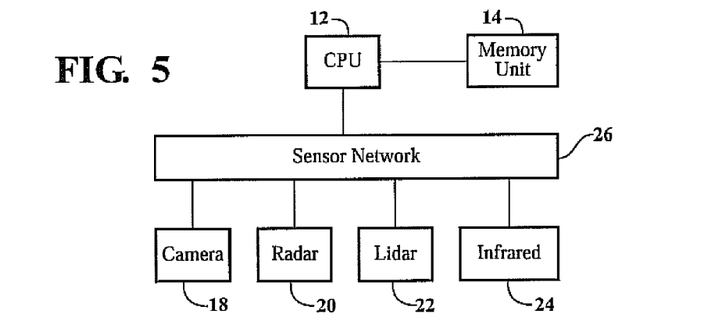
FIG. 5 is a block diagram depicting exemplary hardware utilized by the MTMVT.

As shown in FIG. 4, while the MTMVT 10 was described for tracking a single object 34, in some instances the MTMVT 10 is used to track additional objects 80. In this situation, additional particles 82 are obtained for the additional objects 80 and the MTMVT 10 is performed to track the additional objects 80.

The specific algorithms used by the MTMVT 10 will now be described and explained in greater detail. The state variable $y_t$ describes the location and shape of a target or an object 34 at time frame t. The tracking problem can be formulated as an estimation of the state probability $p(y_t|x_{1:t})$, where $x_{1:t}=\{x_1, \ldots, x_t\}$ represents the observations from previous t frames. To model the observation likelihood $p(x_t|y_t)$, a region corresponding to state $y_t$ is first cropped from the current frame. The region is then normalized and reshaped to a 1D vector x, which is used as a target candidate.

Sparse Representation Based Tracker. In the Mei reference, the sparse representation of x is formulated as a minimum error reconstruction through a regularized $l_1$ minimization function with nonnegativity constraints $$\min_w \|Mw - x\|_2^2 + \lambda\|w\|_1, \text{ s.t. } w \geq 0, \quad (1)$$

where M=[D, I, -I] is an over-complete dictionary that is composed of target template set D and positive and negative trivial template sets I and -I. Each column in D is a target template generated by reshaping pixels of a candidate region into a column vector; and each column in the trivial template sets is a unit vector that has only one nonzero element. $w=[\alpha^T, e^{+T}, e^{-T}]^T$ is composed of target coefficients $\alpha$ and positive and negative trivial coefficients $e^+$, $e^-$ respectively.

Finally, the observation likelihood is derived from the reconstruction error of x as $$p(x|y) = \frac{1}{\Gamma}\exp\{-\alpha\|Da - x\|^2\}, \quad (2)$$

where a is obtained by solving the $l_1$ minimization (1), $\alpha$ is a constant controlling the shape of the Gaussian kernel, and $\Gamma$ is a normalization factor.

While intensity appearance modeling with $l_1$ minimization is very robust to occlusion, noise, and other tracking changes, it is very sensitive to shape deformation of the target such as with non-rigid objects like humans. The MTMVT overcomes these shortcomings by considering other visual features like shape and texture as complementary to the intensity vector in the target appearance representation. The MTMVT combines multi-view representation with robust multi-task learning and dynamic view weighting to solve complex visual tracking problems.

Robust Multi-Task Multi-View Sparse Learning. The MTMVT considers n particle samples where each sample has K different modalities of features (e.g., color, shape and texture). For each modality index k=1, ..., K, denote $X^k \in R^{d_k \times n}$ as the feature matrix which is a stack of n columns of particle image feature vectors of dimension $d_k$, where $d_k$ is the dimension for the kth modality. The target dictionary is denoted as $D_t^k \in R^{d_k \times N}$ where each column is a target template from modality k, and where N is the number of target templates. It can be combined with a background dictionary $D_b^k$ or trivial templates $I_{d_k}$ to construct the evaluated dictionary $M^k=[D_t^k, D_b^k]$ or $M^k=[D_t^k, I_{d_k}]$. Without loss of generality, $I_{d_k}$ is considered as a special case of background dictionary and $D_b^k$ is used to denote both $D_b^k$ and $I_{d_k}$ in the rest of the section.

Based on the fact that the majority of the particles are relevant and outliers often exist, a robust multi-task learning scheme is induced to capture the correlations of each task. The MTMVT jointly evaluates K modality feature matrices $\{X^1, \ldots, X^K\}$ with n samples and learns the latent representations $\{W^1, \ldots, W^K\}$. The decomposed matrices $W^k$s enable different views of particles that have different learned representations and therefore exploit the independencies of each view and capture the different statistic properties. Moreover, each representation matrix $W^k$ is constructed by two collaborative components $P^k$ and $Q^k$, where $P^k$ is regularized by row sparse constraint, which assumes all particles sharing the same basis, while $Q^k$ is regularized by column sparse constraint, which enables the capture of the outlier tasks.

The MTMVT considers two different scenarios based on the number of basis vectors in the dictionary for different modalities. First, when the $M^k$s have the same number of columns, i.e. the same number of basis vectors in the dictionary, the weight matrix $W^k$ for each modality is decomposed into two components $P^k$ and $Q^k$. Since each modality feature matrix has the same column, the corresponding decomposed weight matrix $P^k$ and $Q^k$ can be stacked horizontally to form a bigger matrix P and Q that consist of the weights across all the modalities. Group lasso penalty is applied on row groups of the first component P for capturing the shared features among all tasks over all modalities. The same group lasso penalty is imposed on column groups of the second component Q to identify the outlier tasks simultaneously.

$$\min_{W,P,Q} \sum_{k=1}^{K} \|M^k W^k - X^k\|_F^2 + \lambda_1\|P\|_{1,2} + \lambda_2\|Q^T\|_{1,2}, \quad (3)$$

where $$W^k = P^k + Q^k, P = [P^1, \ldots, P^K], Q = [Q^1, \ldots, Q^K] \quad (4)$$

Secondly, when the $M^k$s have a different number of columns, the corresponding decomposed weight matrix $P^k$ and $Q^k$ can not be stacked to a bigger matrix as the first situation. The MTMVT uses two solutions to handle this situation.

Situation one. If $P^k$ is decomposed into the target weight matrix $P_t^k$ and background weight matrix $P_b^k$, the same technique that was used on $P_t^k$ can be applied to $P_b^k$ since they have the same number of columns due to the shared target templates. The same decomposition can be applied to $Q^k$ as well, and the minimization function is as follows.

$$\min_{W,P,Q} \sum_{k=1}^{K} \|M^k W^k - X^k\|_F^2 + \lambda_1 \sum_{k=1}^{K} \|P_b^k\|_{1,2} + \lambda_2 \sum_{k=1}^{K} \|Q_b^{kT}\|_{1,2} + \lambda_1 \|P_t\|_{1,2} + \lambda_2 \|Q_t^T\|_{1,2} \quad (5)$$

where $$W^k = P^k + Q^k, P^k = [P_t^k, P_b^k], Q^k = [Q_t^k, Q_b^k], P_t = [P_t^1, \ldots, P_t^K], Q_t = [Q_t^1, \ldots, Q_t^K] \quad (6)$$

Situation two. If the matrices $M^k$s are padded with zero columns to make them the same number of columns, the same technique as the first situation can be used. The coefficients associated with the zero columns will be zeros based on the sparsity constraints from $l_i$ regularization and do not have impact on the minimization function in terms of the solution. Without loss of generality, it is assumed that the $M^k$s are sorted in descending order of the number of columns $n_k$, that is, $n_1 \geq n_2 \geq \ldots \geq n_K$. The new $\hat{M}^k$ is defined as the zero padded matrix of $M^k$, that is, $\hat{M}^k = [M^k, 0^k]$, where $0^k \in R^{d_k \times (n_1 - n_k)}$ and every element in $0^k$ is zero. The $M^k$ in Equation (3) is replaced with $\hat{M}^k$ and the same minimization function is solved.

Figure 6:
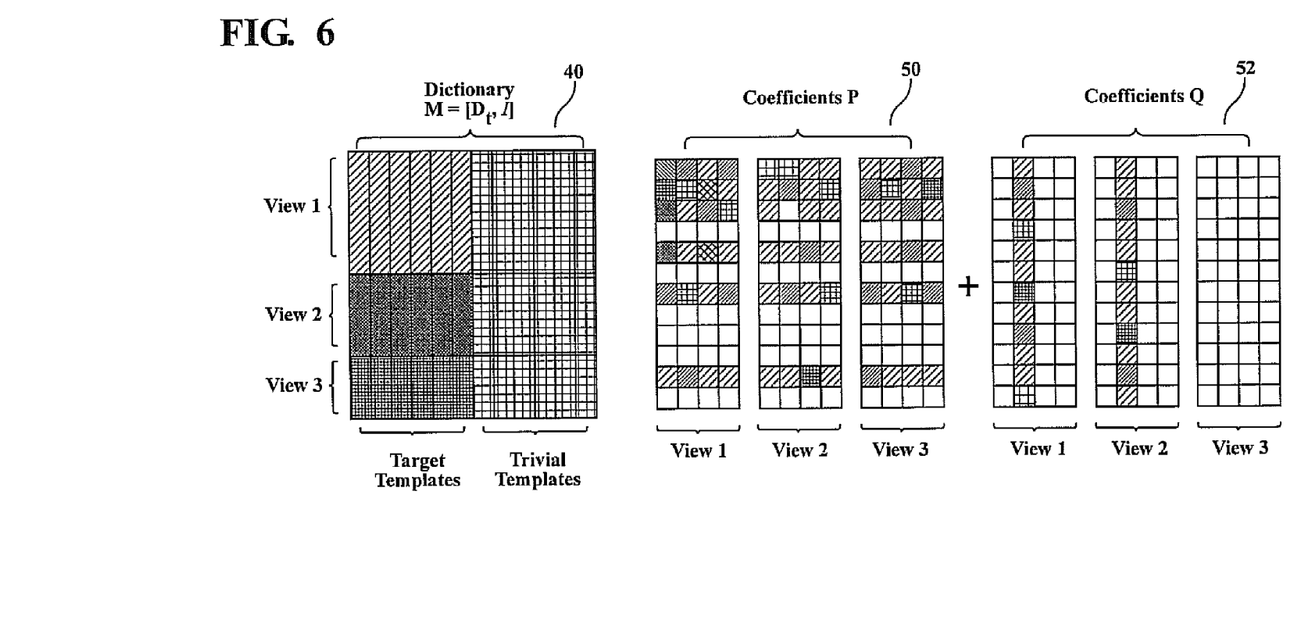
FIG. 6 is a visualization of the structure of the matrices $P^k$ and $Q^k$.

FIG. 6 illustrates the structure of the learned coefficient matrices P 50 and Q 52. The entries with different shading represents different learned values. The white entries in P 50 and Q 52 indicate the zero rows and columns In the exemplary case, there are four particles 32, where the second particle 32 is an outlier 62 whose coefficients in Q 52 comprise large values.

Figure 8:
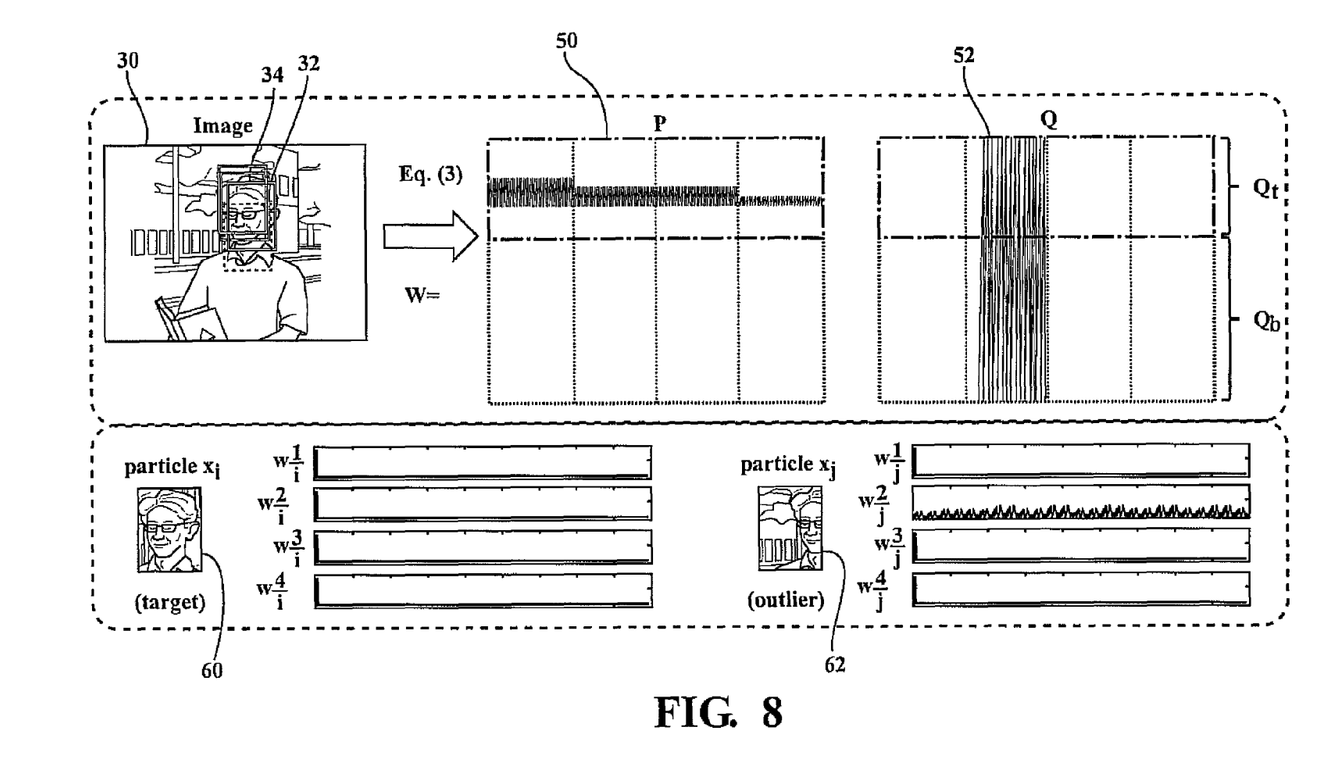
FIG. 8 is a visualization of learned coefficients.

FIG. 8 is a visualization depicting an empirical example of the learned sparse coefficients. A plurality of particles 32 are extracted from the reference frame 30 about the object 34. The collaborative weight matrices $P^k$ 50 and $Q^k$ 52 are visualized to show the learned values for all the particles 32. The four columns of $P^k$ 50 and $Q^k$ 52 represent different features and the rows are the representations of the coefficients of the particles 32. The spots in the second column of $Q^k$ 52 indicate the presence of outliers 62. The two bottom boxes illustrate the coefficients of the tracking target result 60 and an outlier 62.

Dynamic View Weighting. In the reference of the tracking result, each view is weighted based on the discriminativity of the tracking. View discriminativity is defined as the entropy of the particle probabilities. The probability of the particle i for each view k is defined as $$p_i^k = \frac{1}{\Gamma} \exp\{-\alpha \|M^k W_i^k - X_i^k\|^2\}, \quad (7)$$

where $W_i^k$ is the ith column of the kth view which corresponds to the ith particle, the same definition for $X_i^k$. The entropy of the normalized particle probabilities for kth view is defined $$h^k = -\sum_{i=1}^{n} p_i^k \log(p_i^k), \sum_{i=1}^{n} p_i^k = 1 \quad (8)$$

The probability of the tracking candidate i is defined as $$p_i = \frac{1}{\Gamma} \exp\left\{-\alpha^k \sum_{k=1}^{K} h^k \|M^k W_i^k - X_i^k\|^2\right\}, \quad (9)$$

The tracking result is the particle that has the maximum probability $p_{max} = \max\{p_1, \ldots, p_n\}$.

A more general formulation of equation (3) can be written as $$\min_{W,P,Q} \sum_{k=1}^{K} \|M^k W^k - X^k\|_F^2 + \lambda_1 \|P\|_{1,2} + \lambda_2 \|Q^T\|_{1,2}, \quad (10)$$

where $\|P\|_{p\text{-}q} = \Sigma_i(((\Sigma_j p_{i,j}{}^q)^{1/q})^p)^{1/p}$ is the $l_{p,q}$ norm of P. To restrict a sparse number of dictionary templates to be selected by all particles across all views, let p=1, then $\|P\|_{1,q} = \Sigma_i(\Sigma_j p_{i,j}{}^q)^{1/q}$ is derived, which encourages P to be row sparse. For the options of q, three widely studied mixed norms, $q \in \{1, 2, \infty\}$ are selected. Next, equation (10) is discussed where different combinations of $\lambda_2$, q, K yield different trackers. If the tracker is restricted to the case of $\lambda_2 = +\infty$ and K=1 for a single view multi-task problem, then Q=0. So (10) is degenerated to the formula as follows $$\min_{P} \frac{1}{2} \|MP - X\|_F^2 + \lambda_1 \|P\|_{p,q}, \quad (11)$$

which is used in Multi-Task Tracking (MTT). Furthermore, if q=1, the obtained formulation is intrinsically the same as (1) which is the original $l_1$ tracker. In this way, both the MTT tracker and the $l_1$ tracker can be regarded as special cases of the MTMVT algorithm in the single view scenario.

Another single view version of the MTMVT algorithm can be discussed where K=1 and appropriately setting $\lambda_2 > 0$ in which some nonzero columns of Q will be obtained if outliers exist. Specifically, if q=2, a robust MTT tracker is derived as $$\min_{P} \frac{1}{2} \|MW - X\|_F^2 + \lambda_1 \|P\|_{1,2} + \lambda_2 \|Q^T\|_{2,1}, \quad (12)$$

where W=P+Q, and the component P can exploit the underlying relationships of majority particles, while the component Q is able to capture the outlier tasks simultaneously, which yields more robust representations.

Figure 7:
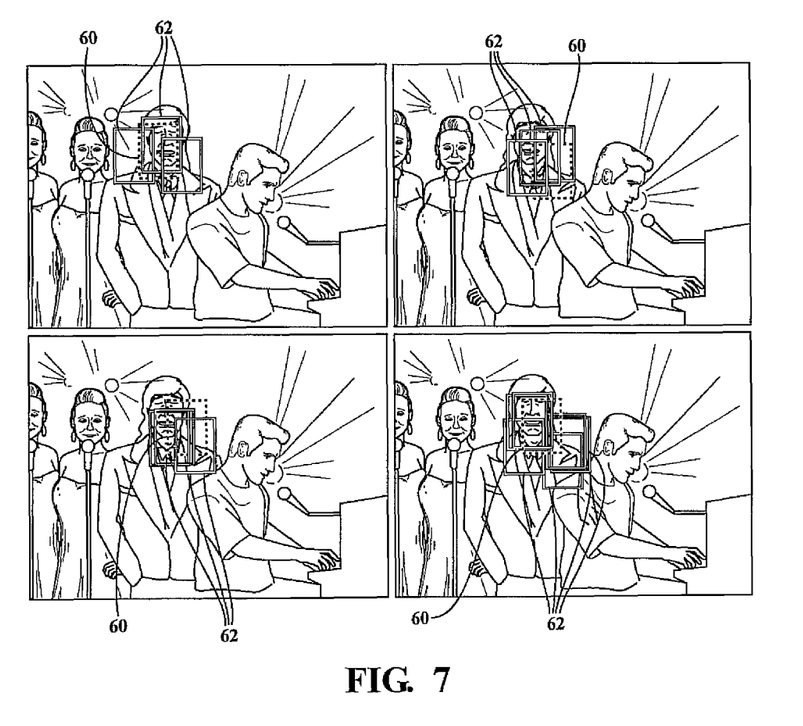
FIG. 7 is an example of detected outlier tasks over a sequence of frames.

Outlier Rejection. Although a majority of particles would share the same dictionary basics, some outlier tasks may exist. These are the particles sampled far away from the target that have little overlap with other particles. The MTMVT in (3) is capable of capturing the outlier tasks by introducing the auxiliary coefficient matrix Q. In particular, if the sum of the $l_1$ norm of the coefficients for the corresponding ith particle is bigger than an adaptive threshold γ, as $$\sum_{k=1}^{K} |Q_i^k| > \gamma, \quad (13)$$

where $Q_i^k$ is the ith column of $Q^k$, then it will be identified as a outlier and its observation likelihood will be set to zero, and thus the outliers will be ignored in the particle resampling process. Therefore, samples are utilized more efficiently without wasting samples on the outliers. By denoting the number of detected outlier tasks as $n_o$, the threshold γ is updated as follows $$\begin{cases} \gamma_{new} = \gamma_{old}\kappa, \ n_o > N_o \\ \gamma_{new} = \gamma_{old}/\kappa, \ n_o = 0 \\ \gamma_{new} = \gamma_{old}, \ 0 < n_o \leq N_o \end{cases} \quad (14)$$

where κ is a scaling factor, and $N_o$ is the maximum number of the outlier detected. FIG. 7 illustrates some examples showing outliers 62 that are detected and rejected.

Experiments. To evaluate the effectiveness of the present invention, the MTMVT was implemented using four complementary features as four different views. The tracker was extensively tested in several publicly available challenging sequences, and compared it with five other popular trackers or related ones including L1 Tracker (L1T), Multi-Task Tracking (MTT), Visual Tracking Decomposition (VTD), tracking with Multiple Instance Learning (MIL), and Incremental Learning for Visual Tracking (IVT). The experiments were conducted by running source codes provided by the original authors. All the parameters are set to default.

Implementation Details. To take advantage of complementary features, four popular features including intensity, color histograms, Histograms of Oriented Gradients (HOG) and Local binary patterns (LBP) were employed. Histograms of Oriented Gradients (HOG) is a gradient-based feature that captures edge distribution of an object. Local binary patterns (LBP) is a powerful feature for representing the object texture. Some work combining LBP and HOG has demonstrated superior performance in pedestrian detection tasks. Moreover, to ensure the quality of extracted features, a simple but effective illumination normalization method was applied before the feature extraction.

For all reported experiments the following settings were used: $\lambda_1=\lambda_2=0.5$, the number of particles n=400 (same as UT and MTT), the number of template samples N=10, and the template updating threshold θ=30. The template of intensity was set to one third size of the initial target (half size for those whose shorter side is less than 20), while the color histograms, HOG, LBP were extracted in a bigger template that was double the size of the intensity template. All sequences were resized to 320×240 for easy comparison and evaluation.

Figure 9:
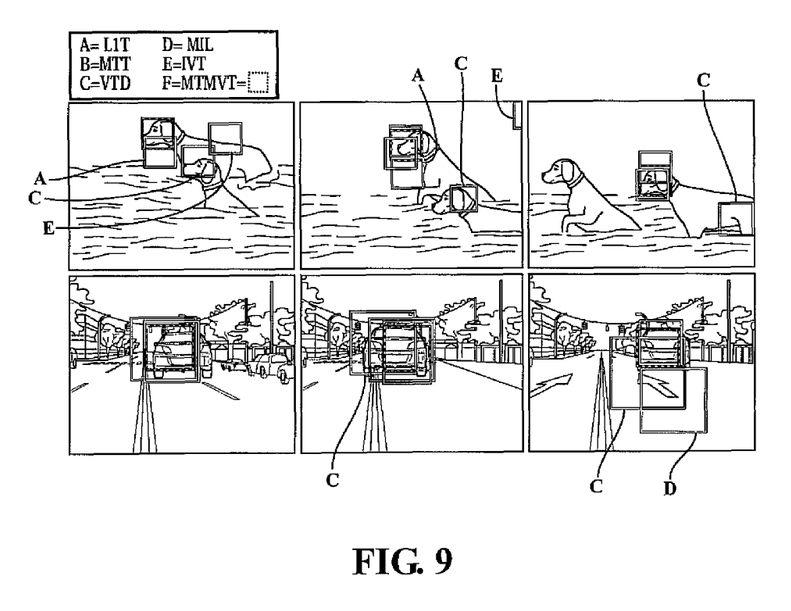
FIG. 9 shows tracking results of the MTMVT versus other prior art trackers over an example sequence.

Qualitative Comparison. The Animal and Car4 sequences shown in FIG. 9 demonstrate tracking the head of fast running deer and a moving car, respectively. The main challenges of these two sequences include fast motion, background clutter, scale changes and illumination changes, etc. For the Animal sequence, only MIL and MTMVT succeed to track the target over the whole sequence, while MTT only tracks most of the frames. The IVT gradually drifts from the target starting in the second frame and totally loses the target by the seventh frame. The L1T fails during the fast motion and motion blur. Apparently, the multi-task manner enables MTT and MTMVT to be more robust than L1T. However, MTT is not as robust as MTMVT since MTMVT takes advantage of the complementary features and is capable of detecting outlier tasks. In the Car4, both MTMVT and IVT perfectly track the moving car despite the dramatic illumination changes and scale changes, which have been shown in the second row of FIG. 9. By contrast, VTD and MIL lose the target and UT tends to be unstable when the car is moving under the bridge, which leads to significant illumination change.

Quantitative Comparison. For more intuitive comparison, the average position errors for ten test sequences taken from a public domain are summarized in Table 1. It shows that the MTMVT achieved the best average performance over all tested sequences and beats the other five selected trackers. Only MTMVT successfully tracked all targets in the experiments, indicating that the tracker of the present invention is not as sensitive to shape deformation as previous trackers due to the effective use of complementary features.

TABLE 1

Average position error (pixels).

| Seq. name | L1T | MTT | VTD | MIL | IVT | MTMVT |
|---|---|---|---|---|---|---|
| Animal | 23.1 | 7.3 | 104.0 | <u>3.7</u> | 143.9 | *6.9* |
| Car4 | 5.7 | 2.0 | 28.8 | 59.4 | <u>1.4</u> | *1.6* |
| David | 26.1 | 38.7 | 53.8 | *16.0* | 20.1 | <u>3.5</u> |
| Kitesurf | 34.6 | 43.6 | 102.3 | <u>3.3</u> | 64.5 | *4.2* |
| Shaking | 59.9 | 11.9 | 8.4 | *8.2* | 112.2 | <u>4.5</u> |
| Faceocc2 | 9.1 | 6.9 | 23.0 | 13.9 | <u>4.7</u> | *5.6* |
| Sylv | 16.2 | *7.1* | 23.9 | 17.7 | 27.9 | <u>3.2</u> |
| Tiger1 | *20.7* | 30.9 | 55.5 | 26.3 | 122.3 | <u>8.1</u> |
| Bolt | 197.4 | 74.8 | *9.3* | 14.2 | 158.8 | <u>6.0</u> |
| DH | 18.5 | 4.3 | <u>3.7</u> | 4.9 | 62.0 | *4.1* |
| Skating1 | 33.9 | *6.6* | 48.0 | 41.4 | 53.9 | <u>4.7</u> |
| Gym | 93.8 | 71.8 | <u>5.9</u> | 25.4 | 32.8 | *7.3* |
| Average | 41.5 | 24.5 | 26.9 | *23.1* | 48.7 | <u>4.7</u> |

<u>Underlined</u> numbers indicate the best performance, while *italics* indicate the second.
Note that the average is computed as weighted average with respect to the sequence length.

As shown, the tracker of the present invention is a robust multi-task multi-view joint sparse learning method for particle filter based tracking. By appropriately introducing the $l_{1,2}$ norm regularization, the method not only exploits the underlying relationships shared by different views and different particles, but also captures the frequently emerging outlier tasks ignored by other trackers. The MTMVT was elaborately implemented using four types of complementary features, i.e. intensity, color histogram, HOG and LBP, and extensively tested on several challenging sequences. The experimental results proved that the MTMVT is able to take advantage of multi-view clues and correctly identify the outlier tasks. Compared with other five popular trackers, the MTMVT demonstrates a generally superior performance Furthermore, the proposed method can be readily extended to handle cues obtained from different types of sensors, rather than conventional video cameras. Having described the invention, however, many modifications thereto will become apparent to those skilled in the art to which it pertains without deviation from the spirit of the invention as defined by the scope of the appended claims.

The invention claimed is:

1. A method for tracking an object using a sensor network comprising:
   selecting one or multiple reference frames from a plurality of data frames captured from the sensor network;
   identifying the object to track and obtaining a plurality of tracking target templates from the reference frames;

extracting a set of multiple views from each of the tracking target templates;
sampling a plurality of image patches proximate the location of the object in subsequent frames relative to the reference frame;
extracting the set of multiple views from each image patch;
solving a minimization problem in a robust multi-view multi-task framework for each image patch to calculate a probability for each of the multiple views;
calculating an entropy of each of the multiple views using the probabilities of all the image patches; and
determining a tracking result using the image patch with the highest probability using a multi-view weighting for the purpose of tracking and identifying the object.

2. The method of claim 1, further comprising:
calculating a minimum reconstruction error for each of multiple views for each image patch as a single task in a multi-task learning process.

3. The method of claim 2, further comprising:
identifying commonalities between a plurality of interdependent tasks and identifying an outlier task in the multi-task learning process.

4. The method of claim 1, further comprising:
the sensor network having a plurality of sensors; and
selecting a set of data frames from each of the sensors.

5. The method of claim 4, further comprising:
calculating a view weight using the entropy of all of the image patch probabilities for each view.

6. The method of claim 5, further comprising:
calculating an object tracking probability by dynamically computing the view weights for each set of data frames.

7. The method of claim 1, further comprising:
processing the data frames with a computer processing unit (CPU) operable to perform extracting, sampling, calculating, identifying, and minimization functions; and
storing a CPU data output in a memory unit.

8. A method for obtaining a tracking target result for an object using a computer processing unit (CPU), a memory unit, and a sensor network comprising:
capturing a plurality of data frames from the sensor network and storing the data frames in the memory unit;
selecting a reference frame with the CPU from the plurality of data frames and identifying the object;
obtaining a plurality of particles from the reference frame proximate a location of the object;
sparsely representing a set of multiple features from each of the particles in a representation matrix using a multi-task formulation;
decomposing the representation matrix into a pair of collaborative weight matrices and minimizing a reconstruction error with penalty terms;
computing a probability that the particle is the tracking target result; and
identifying the tracking target result as the particle with the highest probability.

9. The method of claim 8, further comprising:
sampling a plurality of image patches proximate the location of the object in subsequent frames relative to the reference frame; and
identifying the image patch with the smallest reconstruction error relative to the tracking target result for the purpose of tracking and identifying the object.

10. The method of claim 8, further comprising:
the sensor network having a plurality of sensors; and
selecting a set of data frames from each of the sensors.

11. The method of claim 10, further comprising:
calculating a view weight using an entropy of all of the image patch probabilities for the corresponding view.

12. The method of claim 11, further comprising:
calculating an object tracking probability by dynamically computing the view weights for each set of data frames.

* * * * *